Patented Oct. 12, 1954

2,691,638

UNITED STATES PATENT OFFICE 2,691,638

PROCESS FOR PREPARING CONDENSATION PRODUCTS FROM INGREDIENTS COMPRISING UREA AND FORMALDEHYDE

Hamline M. Kvalnes and Laurence T. Sherwood, Jr., Wilmington, Del., assignors to E. I. du Pont de Nemours and Company, Wilmington, Del., a corporation of Delaware No Drawing. Application July 2, 1952,
Serial No. 296,921

5 Claims. (Cl. 260—17.3)

This invention relates to an improved process for preparing urea-hexamethylenediamine-formaldehyde condensation products.

In the copending application of William Robert McClellan, Serial No. 154,727, filed April 7, 1950, now Patent No. 2,668,155, it was disclosed that condensation products of exceptionally high quality can be obtained by condensing urea with formaldehyde and hexamethylenediamine in the proportions of 1.5 to 2.5 mols of formaldehyde per mol of urea, and 0.03 to 0.12 mol of hexamethylenediamine per mol of urea, there being present in the reaction mixture a sufficient quantity of an acid to produce a pH between 5.0 and 6.5. In the McClellan process for preparing the said condensation products, urea was mixed with formaldehyde, after which the hexamethylenediamine and the acid catalyst were introduced, and thereafter the mixture was heated at a temperature of about 65° C. to 75° C. until a clear solution having a pH between 5.0 and 6.5 was produced. This mixture could be combined with a cellulose filler, and the resulting composition could be molded while applying heat and pressure to produce molded objects having exceptionally high strength and resistance to moisture. In the copending application of Walter M. Bruner, Serial No. 154,720, filed April 7, 1950, it was disclosed that a liquid urea-formaldehyde composition, namely a polymethylolurea prepared in accordance with the process of the Kvalnes Reissue Patent 23,174, could be modified with hexamethylenediamine (e. g., in the form of a salt), the resulting mixture being effective for improving the wet burst strength of paper.

The previously known processes for modifying urea-formaldehyde condensation products with hexamethylenediamine have given products of excellent quality, but unexplained variations in these products have been observed. In studies to discover the explanation for the lack of uniformity of the results obtained by the previously known processes, we have discovered that in certain instances the formaldehyde reactant evidently acted as a methylating agent instead of an agent for introducing methylol groups. Thus we have found that a substantial part of the formaldehyde in these instances reacted irreversibly, i. e. it was not recoverable by acid hydrolysis and distillation, and as explained hereinafter; also, the quality of the resin was inversely related to the content of irreversibly bound formaldehyde, i. e. content of N-methyl groups. A problem arose, therefore, as to how to avoid the danger of excessive methylation. Furthermore, if precautions are taken to avoid localized excessive temperature, coupled with a localized excess of the hexamethylenediamine, the resulting product has greatly improved solubility. In fact, if these precautions are not taken the product contains an insoluble precipitate, which of course is quite disadvantageous.

An object of the present invention is to provide improvements in the previously known processes for preparing urea-hexamethylenediamine-formaldehyde condensation products so that uniform results and homogeneous mixtures can be more satisfactorily obtained, while avoiding the formation of methyl substituents from formaldehyde, in the intermediate condensation stage. Other objects of the invention will appear hereinafter.

These objects are accomplished in accordance with the present invention by a process which includes the step of introducing hexamethylenediamine into aqueous formaldehyde at a temperature below 20° C., preferably 0° C. to 5° C., without any added catalyst. Refrigeration is necessary to maintain this low temperature. Vigorous agitation coupled with sufficiently slow addition of the hexamethylenediamine to prevent insoluble precipitate formation, is an effective method for avoiding localized overheating. Under these conditions the pH of the reaction mixture remains at about 7.5 to 9, usually 7.8 to 8.5 and the reaction appears to be mainly or exclusively the formation of methylolhexamethylenediamine. If, in contrast with this, one employs a temperature above 20° C. and particularly if one employs room temperature or any higher temperature, the hexamethylenediamine is capable of reacting with a maximum of about 6 mols of formaldehyde per mol of hexamethylenediamine (which exceeds the maximum formaldehyde consumption attributable to methylolation or methylenation), and the resulting product contains N-methyl groups.

Stoichiometrically 6 mols of formaldehyde correspond with the formation of 2 equivalents of N-methyl groups.

After the formaldehyde and hexamethylenediamine are combined at low temperature, the resulting mixture can be treated without special care and the irreversible reaction of the methylol groups is very slow. Urea can be added, and the mixture thus obtained can be heated to a temperature as high as 80° C. or higher (but heating is not necessary) to produce an excellent intermediate which is suitable for use in impregnating cellulose.

A true latent catalyst for liquid urea-formaldehyde resin systems is obtained by only partially reacting the hexamethylenediamine-formaldehyde reaction product with a strong acid. By thus adjusting the pH to about 7 or higher the working life of the liquid resin is essentially as good as in the absence of the acid. Cellulose impregnated with this mixture dries more easily and more satisfactorily than a ureaformaldehyde impregnated cellulose which is not modified with hexamethylenediamine. The dried material is capable of curing without the addition of any further quantity of catalyst.

Due to the presence of hexamethylenediamine component, only strong acids are effective in obtaining cure with the pH in the range 6.5–7.0 or higher. The present invention does not require the use of special organic acid catalysts, although such special catalysts if sufficiently strong can of course be employed, if desired. Formic acid is ineffective. The pH may be as low as 6.5 but, as hereinabove indicated, exceptionally good results are obtained when the quantity of strong acid introduced is such as to produce a pH of 7.

One of the advantages of the present invention is that it permits the use of a quantity of hexamethylenediamine which is below the minimum required in the process of the hereinabove mentioned copending application Serial No. 154,727. For example, excellent results are obtained when the quantity of hexamethylenediamine is only 1.0 mol per 200 mols of urea. The present invention, however, is not limited to the use of such comparatively small amounts of hexamethylenediamine, since products containing one mol of hexamethylenediamine per 10 mols of urea are also strikingly good, especially from the standpoint of moisture-resistance. However, the fact that the quantity of hexamethylenediamine employed can thus be lowered (e. g., below 1 mol per 100 mols of urea) is highly important, not only from the standpoint of the cost of hexamethylenediamine, but more importantly because the products having a relatively high content of hexamethylenediamine are susceptible to staining with certain foodstuffs, such as coffee. At the low levels of hexamethylenediamine content hereinabove mentioned, this susceptibility to staining is lessened to such an extent that use of the resins in dishware, etc., becomes feasible.

The formaldehyde which is employed in the practice of the present invention may be introduced in any convenient form. Various aqueous solutions of formaldehyde, and particularly the ordinary formalin solution of commerce, can be employed with very good results.

The process of this invention can be illustrated further by means of the following examples. Example 1 illustrates procedures to prepare stable hexamethylenediamine - formaldehyde liquids which are essentially free of the products of the irreversible reactions of formaldehyde; Example 3 illustrates procedures to convert the stable liquids of Example 1 to unstable resin intermediates which may be used as impregnating liquids; Example 4 illustrates the use of low concentrations of hexamethylenediamine-formaldehyde products to buffer UF liquids during the methylolforming step; Example 5 illustrates the use of low concentrations of essentially neutral salts of hexamethylenediamine-formaldehyde products to increase the drying rate of impregnated cellulose and to improve the ball-milling properties of the dried, treated cellulose; Example 6 illustrates the use of essentially neutral salts of hexamethylenediamine-formaldehyde products as latent catalysts for UF liquids and impregnated compositions prepared from these liquids as well as the marked improvement in UF moldings using low concentrations of the diamine.

Example 7 illustrates a rather extreme case of the deteriorating effects of the products of the irreversible reactions of formaldehyde on the properties of diamine modified UF moldings.

The products of the irreversible reactions of formaldehyde which form on mixing formaldehyde and hexamethylenediamine, increase with increase in temperature at which the two materials are mixed together. This is shown in Examples 1 and 2. At 0–5° C. three mols of formaldehyde reacted per mol of hexamethylenediamine and all of this formaldehyde could be recovered by acid distillation. The combined formaldehyde could be recovered as free formaldehyde. However, at room temperature and higher temperatures more than three mols of formaldehyde reacted per mol of hexamethylenediamine and part of the formaldehyde reacted irreversibly. Thus in Example 2, where hexamethylenediamine was mixed with hot 60% formaldehyde more than five mols of formaldehyde reacted per mol of hexamethylenediamine and all of the formaldehyde reacted irreversibly (zero recovery in acid distillation).

Two irreversible reactions of formaldehyde are known which would account for the results obtained in Example 2. Under alkaline conditions methanol and formic acid form by the Cannizzaro reaction. At high temperatures and high pH this reaction results in considerable loss of formaldehyde. Since the pH of hexamethylenediamine is about 11.0 the high localized alkalinity on adding hexamethylenediamine to formalin would strongly favor the Cannizzaro reaction at room or higher temperatures.

Also formaldehyde reacts irreversibly in the presence of formic acid and amines to methylate the amine nitrogen. The overall reaction results in the irreversible conversion of three mols of formaldehyde per mol of methyl group formed on the amine nitrogen.

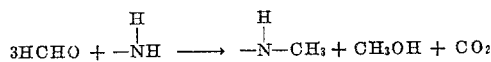

Apparently then there was formed in Example 2 a mixture of N-methyl-, and N:N'-dimethyl-, derivatives of hexamethylenediamine.

Examples 1 and 2 lead to two conclusions:

(1) When (due perhaps to localized overheating) a precipitate forms on mixing hexamethylenediamine with formaldehyde, and the precipitate is dissolved by continuing to heat the mixture, an appreciable amount of formaldehyde reacts irreversibly.

(2) When hexamethylenediamine is mixed with formaldehyde at a low temperature in such a manner that permanent precipitate formation is avoided as hereinabove described, and the solution is heated, there is slight, if any, consumption of formaldehyde through irreversible reactions.

Analytical data indicate that the precipitate which forms when hexamethylenediamine is mixed with formaldehyde, as above described, is the Schiff base, $CH_2=N-(CH_2)_6-N=CH_2$, or trimer thereof. Since there are two groups in the hexamethylenediamine derivative which can trimerize the precipitate is probably a very complex material. Generally the precipitate can be brought into solution by lowering the pH of the solution well below 7.0. Also, if the pH of the resulting solution is raised to 7.0 the precipitate forms again.

The disadvantage of the precipitate, aside from processing disadvantages, is that a relatively large amount of acid must be added to dissolve it and the pH of the resulting solution is low. With urea present the life of the solution at low pH is very short, i. e., less than an hour.

Since the liquids of Examples 1 and 2 are stable they are not suitable for use as such in resin applications. In order to activate these stable liquids it is necessary to add urea to lower the F/U ratio (i. e. total mols of formaldehyde, free and combined, per mol of urea) to less than about 2.2. The adjustment of the F/U ratio to from 1.01:1 to 2.2:1 is carried out prior to the methylolation step, i. e., heating at slightly alkaline pH.

The mixture of added urea and hexamethylenediamine-formaldehyde product may be used directly as a resin intermediate. However, the methylol-forming step generally is carried out first to lower the free formaldehyde content. One advantage of thus decreasing the free formaldehyde, by methylolation, to zero, or to a low value, is to improve odor in the vicinity of equipment containing the resin intermediate. The preparation of unstable liquid resin intermediates from the stable hexamethylenediamine-formaldehyde liquids, such as those of Examples 1 and 2, are described in Example 3.

The pH of aqueous hexamethylenediamine solutions is about 11.0 but the pH of freshly prepared hexamethylenediamine-formaldehyde solutions is 8-8.5. The buffering activity of these solutions is high and the pH is optimum for reacting formaldehyde and urea to produce methylol groups. In the pH range 6.5-8.5 the methylol reaction is rapid and the Cannizzaro reaction is relatively slow. Surprisingly low concentrations of hexamethylenediamine effectively buffer the UF liquid while carrying out the methylol-forming step. As shown in Example 4, as little as 2.5 weight percent hexamethylenediamine (calculated on urea plus diamine) is adequate for buffering action during a short methylol-forming step, i. e., incomplete conversion of formaldehyde to methylol groups.

As explained hereinabove, a unique advantage of hexamethylenediamine-formaldehyde products in UF liquids is that cellulose impregnated with the modified liquid at pH 7.0 dried much more rapidly than cellulose impregnated with unmodified UF liquids at pH 7.0. This is shown in Example 5. Unmodified UF liquids must be adjusted to a pH of about 5.5 prior to impregnating the cellulose in order to obtain even moderately rapid drying of the treated cellulose and minimum ball-milling properties. However, the working life of UF liquids at pH 5.5 is only 1 to 4 hours. Thus use of hexamethylenediamine-formaldehyde products (1) decreases the time of drying impregnated products, (2) results in better ball-milling properties of impregnated cellulose, and (3) greatly increases the working life of the impregnating liquid.

The resistance of modified UF moldings to boiling water increases with increase in the hexamethylenediamine content up to 15%. Although there is improvement using 1% hexamethylenediamine, improvement is more marked at 2.5%. On adding 75% hexamethylenediamine solution to formalin at 0-5° C. no precipitate forms until slightly more than 20 weight percent hexamethylenediamine is added (both hexamethylenediamine and formaldehyde calculated on solids basis). This 20% hexamethylenediamine corresponds to about 15 weight percent hexamethylenediamine in hexamethylenediamine-modified urea-formaldehyde of F/U 1.5. Liquids were prepared by adding more than 20 weight percent hexamethylenediamine to formalin at 0-5° C., heating at 80-90° C. to dissolve most of the precipitate and filtering to remove undissolved lumps of precipitate. In this way powders were prepared containing approximately 20 and 30% hexamethylenediamine. The moldings from these powders were less resistant to boiling water cycles than the moldings containing 15% hexamethylenediamine described in Example 6.

Example 7 illustrates the results obtained using a liquid prepared under particularly unfavorable conditions. Thus Example 7 shows that the presence of the products of the irreversible reactions of formaldehyde are detrimental to the properties of hexamethylenediamine modified UF moldings.

EXAMPLE I

| | G. |
|---|---|
| 37% formaldehyde | 973 |
| 75% hexamethylenediamine | 104 |
| p-Toluenesulfonic acid | 11 |
| | 1088 |

The hexamethylenediamine aqueous solution was added dropwise to the vigorously stirred formaldehyde at room temperature. The initial precipitate was finely divided and dissolved rapidly. However, the charge became opaque before all of the hexamethylenediamine was added. After adding the hexamethylenediamine the temperature of the charge was 40° C. and the pH was 8.0. The p-toluenesulfonic acid was then added and the pH decreased to 7.2. The charge became nearly clear but there were undissolved lumps of precipitate present. Most of the remaining precipitate dissolved after heating for 10 minutes at 80-83° C. The free formaldehyde content of the cooled product was 25.45%. Thus 3.55 mols of formaldehyde reacted per mol of hexamethylenediamine.

The above test was repeated at 80-90° C. Precipitate formation was excessive but on continued heating most of the precipitate dissolved. The free formaldehyde content of the product was 23.9%, from which it was calculated that 4.55 mols of formaldehyde reacted per mol of hexamethylenediamine.

The test was repeated at 0-5° C. No precipitate formed on adding the hexamethylenediamine. There was no change in the free formaldehyde content on adding the p-toluenesulfonic acid. The clear solution was warmed to 28° C. and the free formaldehyde content was then 27.15%. Accordingly, 3.0 mols of formaldehyde reacted per mol of hexamethylenediamine. The charge was heated at 70-73° C. for 10 minutes and cooled rapidly. The free formaldehyde content was 26.75%. The formaldehyde reacted at this stage was 3.15 mols per mol of hexamethylenediamine. On acid distillation the formaldehyde recovered was 95% of the total (based on material balance). The unrecovered formaldehyde corresponded to 0.09 mol per mol of hexamethylenediamine. The product was clear and stable, the viscosity was 6 cp., and the pH was 8.3. After three weeks the solution was clear and there had been no change in the viscosity.

EXAMPLE II

| | G. |
|---|---|
| 58.6% formaldehyde | 784 |
| 83.9% hexamethylenediamine | 216 |
| | 1000 |

The hexamethylenediamine solution was added dropwise to the stirred formaldehyde at 60–80° C. and heating was continued until the finely divided precipitate had dissolved. The free formaldehyde content of the product was 23% and the formaldehyde recovered in an acid distillation was also 23.0%. The reacted formaldehyde corresponded to 4.9 mols per mol of hexamethylenediamine. A sample of the product was heated at 80° C. and pH 7.5–9.6 for an additional period of 275 minutes at which time the free formaldehyde content had reached a constant, namely 20.7%. The nonrecoverable formaldehyde corresponded to 5.4 mols per mol of hexamethylenediamine.

EXAMPLE III

|  | G. |
|---|---|
| Hexamethylenediamine - formaldehyde product | 936.0 |
| Urea | 370.5 |
|  | 1306.5 |

A hexamethylenediamine-formaldehyde product was prepared by adding 87 g. of 75% hexamethylenediamine aqueous solution to 849 g. of formalin at 2–6° C. with vigorous stirring. The flask was cooled with ice water but due to the high heat of the reaction the hexamethylenediamine had to be added in small increments over a period of 45 minutes. The urea was then added rapidly to the solution at 6° C. and the temperature dropped to 0° C. The solution was heated to 70° C. in 15 minutes, maintained at 70–78° C. for 7 minutes and cooled to 28° C. in 8 minutes. The pH of the product was 7.9. It contained 15 weight percent hexamethylenediamine calculated on urea plus hexamethylenediamine and the mol ratio of total formaldehyde to urea was 1.7. The pH was adjusted to 7.0 by adding 19.2 g. of 20% sulfuric acid and the resin solids (hexamethylenediamine, formaldehyde, and urea) was adjusted to 50% by adding 174 g. of water. The 50% solution was clear after storage at room temperature for 24 hours but a precipitate had formed in three days.

Similarly an unstable liquid is formed on adding 38 pts. of urea to 75 pts. of the hexamethylenediamine-formaldehyde product of Example 2. The resulting solution contains 23 weight percent hexamethylenediamine calculated on urea plus hexamethylenediamine and the F/U ratio is 1.5.

EXAMPLE IV

A hexamethylenediamine modified UF liquid was prepared as described in Example III. The hexamethylenediamine - formaldehyde product was prepared by adding 14.4 g. of 75% hexamethylenediamine aqueous solution to 856.2 g. of formalin at 1–3° C. The solution was heated to 25° C. and while continuing to heat there was added 422.4 g. of urea. The charge was then heated to 70° C. in 6 minutes, maintained at 70–80° C. for 3 minutes and cooled to 24° C. in 6 minutes. The pH of this product was 7.8 and the free formaldehyde content was 6.7%. The pH was adjusted to 7.0 with 4 g. of 20% sulfuric acid. After 24 hours at room temperature the free formaldehyde content was 2.4% and the solution was clear. However, after 48 hours at room temperature the sample contained precipitate.

The hexamethylenediamine content of the sample was 2.5 weight percent calculated on hexamethylenediamine plus urea and the F/U ratio was 1.5.

The above test was repeated to prepare a hexamethylenediamine modified UF liquid containing 15 weight percent hexamethylenediamine. During the methylol-forming step the charge was held at 70–78° C. for 7 minutes. The pH of the cooled product was 7.9 and the free formaldehyde content was less than 1%.

EXAMPLE V

The two hexamethylenediamine modified UF liquids described in Example VI were used in parallel tests to impregnate cellulose. The freshly prepared liquid (1300 g.) was added to powdered cellulose (350 g.) and the mixture was kneaded by hand until all of the cellulose was wetted. The ratio of chemical solids to dry cellulose was 65:35. The impregnated cellulose was then spread on trays and dried for 24 hours at 67–73° C. and 27–29 in. Hg vacuum. The lumpy product was brittle and completely dry to the touch. This material was converted to a coarse powder by passing through a rotary cutter equipped with a ⅛" screen and the granular powder was easily ball-milled to a fine powder without tendency to pack on the walls of the mill and the grinding media. Cellulose impregnated with an unmodified UF liquid of F/U mol ratio 1.5 at pH 7.0 was unsuitable for ball-milling after drying for 40 hours at 70° C. and 29 in. Hg vacuum. By adjusting the pH of an unmodified liquid to 5.5 and then impregnating the cellulose a product was obtained, after drying for 40 hours at 67° C. and 28–29 in. Hg vacuum, which could be ball-milled. However, this product tended to pack on the walls of the mill.

EXAMPLE VI

Three of the powders prepared in Example V, i. e., modified powders containing 2.5 and 15.0 weight percent hexamethylenediamine respectively and the control from the pH 5.5 liquid, were molded into 2" x ⅛" discs in a positive pressure type mold. The first of these was molded without additives for 4 min. at about 145° C. and 1600 p. s. i. employing a quick 15 sec. breathe. The powder containing 15% hexamethylenediamine was molded under the same conditions both with and without ½% of added trimethyl phosphate catalyst. The control, containing ½% of trimethyl phosphate was molded under the same conditions except that 4000 p. s. i. was employed.

These discs were conditioned for 24 hours in a circulating air oven at 50° C. and were subjected to a standard boiling water cycle test. This consisted of boiling the disc for 3 hours and conditioning it as above for 20 hours and was repeated for five cycles or until the disc failed. The control failed on the first cycle while that containing 2.5% hexamethylenediamine was only slightly cracked after two cycles. The samples containing 15%, both with and without catalyst, were only slightly affected after five such cycles.

EXAMPLE VII

A hexamethylenediamine modified UF liquid was prepared by adding 57 g. of 75% hexamethylenediamine solution slowly to 877 g. of formalin at 80° C. with vigorous stirring. A heavy precipitate formed but it was nearly all dissolved in 20 minutes. After cooling to room temperature, 383 g. of urea was added and the mixture was heated for 12 minutes at 60–70° C. and cooled rapidly to 28° C. The product was adjusted to pH 7.0 by adding 30 g. of 20% sulfuric acid and the solids content (formaldehyde, urea and hexamethylenediamine) was adjusted to 50% by adding 171 g. of water. The hexamethylenediamine content was 10 weight percent calculated on urea plus diamine. This 50% liquid was used to prepare a molding powder by kneading 1300 g. of the liquid into 350 g. of cellulose, spreading the impregnated cellulose onto a tray, and drying it for 24 hours at 70–72° C. and 28–29 in. Hg vacuum. The product was less satisfactory for ball-milling than the treated cellulose samples containing 2.5 and 15.0 weight percent hexamethylenediamine, Example V. In a duplicate test the treated cellulose was still damp after 24 hours' drying. The dried impregnated floc was cut to a coarse powder with a rotary cutter and ball-milled for 17.5 hours to a fine powder. A portion of the powder was ball-milled with 0.5% of trimethyl phosphate catalyst and moldings were prepared from the two powders. A press cycle of 4 min./145° C./600–1900 p. s. i. with quick breathing at 15 seconds was used. The discs thus prepared were mottled and did not appear cured. They disintegrated rapidly in boiling water.

EXAMPLE VIII

Solutions containing hexamethylenediamine, formaldehyde, urea and sulfuric acid were prepared by several procedures as described in Table 2. These solutions were used to treat cloth to increase resistance to creasing and the results are given in Table 1. The resin pick-up by the cloth in test 1 was 13.0% and in test 2 the resin pick-up was 11.1%. The highest resin content was in test 4 and amounted to 14.9%. In the other tests the resin contents were in the range 11.1–11.6%.

It is to be understood that the examples hereinabove given are illustrative only, and that the invention is not limited thereto. Moreover, there are numerous advantages of the invention, in addition to those shown in the examples. An important advantage resides in extension of the working life of the solutions; the working life of standard urea-formaldehyde solutions is only 6 to 8 hours, but in contrast with this a working life of the hexamethylenediamine-latent catalyst modified urea-formaldehyde composition of this invention extending to 100 hours or more is realized. The catalyst is effective in the curing reaction when as little as 0.005 to 0.20 equivalents of acid are present per mol of hexamethylenediamine, thus producing a pH which is still within the range required for prolonged working life.

The order of mixing the three ingredients of hexamethylenediamine modified UF liquids is important, as hereinabove indicated. The preferred procedure is to cool the formalin to 0–5° C. and immediately start adding the hexamethylenediamine at such a rate that the temperature does not rise above 5° C. After the diamine is added the mixture is heated to room temperature and the urea is added. An alternate route is to dissolve the urea in the formalin, cool to 0–5° C. and add the hexamethylenediamine. This is a less satisfactory procedure since after adding the urea the mixture must be warmed in order to rapidly dissolve all of the urea. While the urea is being dissolved some formaldehyde reacts and the concentration of free formaldehyde is reduced. Since the amount of hexamethylenediamine which can be added to a liquid at 0–5° C. before precipitate formation is about 20 weight percent of the free formaldehyde content, less diamine can be added to the urea-formalin composition. If a methylol-forming step is first carried out on the urea-formalin solution the free formaldehyde is reduced to a very low level and then the hexamethylenediamine cannot be added successfully without intermediate precipitate formation.

There is no important advantage in using dilute solutions rather than concentrated solutions of hexamethylenediamine and formaldehyde to minimize the mixing problem. At room or higher temperatures the precipitate is more finely divided with the dilute solutions and so the rate of solution of the precipitate is somewhat greater. However, at 0–5° C. the amount of hexamethylenediamine that can be added to the formaldehyde before precipitate formation is the same with dilute solutions as with concentrated solutions, i. e., 20 weight percent hexamethylenediamine calculated on the free formaldehyde.

The stable liquid polymethylolurea disclosed in the Kvalnes Reissue Patent 23,174 (F/U=5) can be used instead of formalin to prepare hexamethylenediamine-modified UF liquids. There are two differences between the use of this polymethylol urea liquid, and the use of formalin. At 0–5°

Table 1
METHYLOLUREA CLOTH-TREATING SOLUTIONS CONTAINING LATENT CATALYST [1]

| Test Number | Composition of Liquid Resin Intermediate | | | | | | Procedure To Prepare Liquid Resin Intermediate [7] | Composition of Impregnating Solution | | Working life of Impregnating Solution, Hours | Crease Recovery of Treated Cloth [9] |
|---|---|---|---|---|---|---|---|---|---|---|---|
| | Resin [2] Solids | F/U [3] | HMD [4] | $H_2SO_4$ [5] | $\dfrac{H_2SO_4}{HMD}$ [6] | pH | | Resin Added | Added Catalyst | | |
| | | | | | | | | | | | Degrees |
| 1 | 50 | 1.5 | | | | 6.7 | A | 12 | Yes [8] | 6–8 | 149 |
| 2 | 50 | 1.7 | 10.0 | 4.0 | 0.11 | 6.8 | B | 12 | No | >38 | 142 |
| 3 | 50 | 1.5 | 1.0 | 0.4 | 0.11 | 7.1 | C | 12 | No | >60 | 137 |
| 4 | 50 | 1.6 | 5.1 | 1.6 | 0.09 | 6.8 | D | 12 | No | >37 | 143 |
| 5 | 50 | 1.7 | 10.0 | 1.6 | 0.05 | 7.2 | E | 12 | No | >108 | 139 |
| 6 | 50 | 1.7 | 15.3 | 0.4 | 0.01 | 8.6 | F | 12 | No | >50 | 132 |
| 7 | [10] 0 | | | | | | | | | | 116 |

[1] The latent catalysts are the salts of strong acids and the low temperature reaction products of HMD and HCHO.
[2] Weight percent of HCHO, urea and HMD based on liquid resin intermediate, or impregnating solution as indicated.
[3] Mole ratio of HCHO to urea.
[4] Hexamethylenediamine. Weight percent based on urea+HMD.
[5] Grams of 100% $H_2SO_4$ per 750 grams of resin solids.
[6] Mole ratio of $H_2SO_4$ to HMD.
[7] See Table 2.
[8] 1% $(NH_4)_2HPO_4$ based on resin solids.
[9] Gray rayon gabardine was soaked in the impregnating solution for 30 seconds and run through rubber rolls at 450 pounds pressure. This was repeated for a total of three cycles. The cloth was immediately heated, 150° C./6 mins., and then at 80° C./15 mins. to constant weight. Laundering was in an aqueous solution containing 0.2% detergent and 0.1% $Na_2CO_3$ at 60° C./15 mins. After rinsing in cold water and hot water the cloth was heated 80° C./30 mins. The crease resistance of the conditioned cloth was determined using a Monsanto wrinkle recovery tester. In this test the cloth is folded and the spring back is determined. The angle of recovery would be 180° if the cloth was completely resistant to creasing.
[10] Control run using water.

Table 2
PROCEDURES USED TO PREPARE THE METHYLOLUREA CLOTH-TREATING SOLUTIONS OF TABLE 1

| Test Number | Composition of Liquid Resin Intermediate [1] | | | | | | | | | Procedure | Description of Procedures |
|---|---|---|---|---|---|---|---|---|---|---|---|
| | "Arboneeld" B | Formalin | UF-1 | UF-2 | HMD-HCHO | 79.1% HMD | Urea | 16% $H_2SO_4$ | Water | | |
| 1 | 46.07 | | | | | | 20.07 | | 33.87 | A | "Arboneeld" B (formaldehyde, polymer free: urea-5.1 mole ratio) and urea mixed at 25–30° C., heated 50° C./20 mins, cooled rapidly to 25–30° C. and water added. |
| 2 | | 58.53 | | | | 3.59 | 25.47 | 1.67 | 10.74 | B | HMD added dropwise to vigorously stirred formalin at 0–1° C., urea added, heated 50° C./20 mins., cooled rapidly to 25–30° C. and acid and water added. |
| 3 | 45.80 | | | | | 0.36 | 19.93 | 0.16 | 33.75 | C | Same as procedure B except "Arboneeld" B used instead of formalin. |
| 4 | | 59.27 | | | | 1.80 | 26.67 | 0.65 | 11.62 | D | Same as procedure B except that the HMD-HCHO product was heated to 25° C., before adding the urea. |
| 5 | | | 40.00 | 60.00 | | | | | | E | This composition was prepared by mixing two methylol urea solutions, UF-1 and UF-2. Solution UF-1 was the same as Test 2. Solution UF-2 was prepared by procedure D except that no acid was added. The F/U ratio was 13 and the HMD content was 10% based on urea and HMD. |
| 6 | | | | | 62.33 | | 24.67 | 0.16 | 12.84 | F | The HMD-HCHO used in this run was prepared by adding HMD to formalin at 2–7° C. A slight amount of precipitate formed which was removed by filtration. The product was stored at 25–30° C. for 5 days and was then used to prepare the methylolurea solution. Urea and HMD-HCHO were mixed at 25–30° C., heated 50° C./20 mins., cooled rapidly and acid and water added. |

[1] Weight percent based on the liquid resin intermediate.

C. this liquid polymethylol urea composition is permanently stable, while paraformaldehyde precipitates from formalin after a short period at 0–5° C. When this polymethylol urea liquid composition is used in place of formalin the free formaldehyde content is 20% instead of 37%, only enough hexamethylenediamine can be added without precipitate formation to prepare urea-formaldehyde of F/U .5, containing a maximum of 7.5% diamine. However, by starting with a still higher methylolurea having an F/U ratio greater than 5, it becomes possible to add more diamine. For example a corresponding liquid polymethylourea of F/U 10, which contains 37% free formaldehyde, is stable for a few hours. Addition of urea to this intermediate gives unstable F/U 1.5 modified with 15 weight percent hexamethylenediamine calculated on urea plus diamine (ca. 1 mol per 10.0 mols of urea), which can be converted to molded objects as hereinabove described.

The products obtained in accordance with the present invention are especially useful in the manufacture of molded objects, but they may also be used in textile modifying agents, adhesives, baking enamels, and the like. Important applications include manufacture of (1) paper laminates, (2) crease-resistant cloth, (3) cloth laminates and (4) hot press adhesives.

Since many different embodiments of the invention may be made without departing from the spirit and scope thereof, it is to be understood that the invention is limited only as set forth in the following claims.

We claim:
1. A process for preparing condensation products which comprises introducing hexamethylenediamine into a reaction mixture comprising aqueous formaldehyde at a pH of 7.5 to 9, refrigerating the reaction mixture during the introduction of hexamethylenediamine so that the temperature is below 6° C., maintaining the rate of the said introduction of hexamethylenediamine sufficiently slow, and the agitation of the reaction mixture sufficiently rapid, to prevent formation of a precipitate, whereby the hexamethylenediamine is substantially entirely converted to methylolhexamethylenediamine, thereafter admixing urea with the resultant product, whereby a clear solution having a pH between 7 and 8 is obtained, thereafter imparting a thermosetting quality to the resulting mixture by addition of an acidic compound in sufficient quantity to produce a pH in the range of 6.5 to 8.5, the mol ratio of hexamethylenediamine:urea being 1:200 to 1:10 and the mol ratio of formaldehyde:urea being 1.0:1 to 2.2:1.

2. The process of claim 1 in which the temperature of the refrigerated reaction mixture is within the range of 0° to 5° C.

3. The process of claim 2 in which the mol ratio of hexamethylenediamine urea is from 1:200 to 1:100 inclusive.

4. The process of claim 1 in which the added acid is a strong acid and the quantity thereof introduced is sufficient to produce a pH of 7.

5. Process of claim 4 which includes the step of impregnating cellulose with the thermosetting mixture containing the said added acid.

References Cited in the file of this patent

UNITED STATES PATENTS

| Number | Name | Date |
|---|---|---|
| 2,371,997 | Hoover | Mar. 20, 1945 |
| 2,485,485 | Dudley | Oct. 18, 1949 |